US008310561B2

(12) United States Patent
Misawa et al.

(10) Patent No.: US 8,310,561 B2
(45) Date of Patent: Nov. 13, 2012

(54) WHITE BALANCE CORRECTION APPARATUS AND METHOD

(75) Inventors: Takeshi Misawa, Asaka (JP); Makoto Oishi, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1104 days.

(21) Appl. No.: 12/071,128

(22) Filed: Feb. 15, 2008

(65) Prior Publication Data

US 2008/0211925 A1 Sep. 4, 2008

(30) Foreign Application Priority Data

Mar. 2, 2007 (JP) .................................. 2007-053276

(51) Int. Cl.
*H04N 9/73* (2006.01)
(52) U.S. Cl. ............... 348/223.1; 348/220.1; 348/219.1; 348/225.1
(58) Field of Classification Search .................... None
See application file for complete search history.

(56) References Cited

U.S. PATENT DOCUMENTS

| 7,148,922 | B2 * | 12/2006 | Shimada | 348/224.1 |
| 7,542,077 | B2 * | 6/2009 | Miki | 348/223.1 |
| 2005/0206965 | A1 * | 9/2005 | Nakayama et al. | 358/453 |
| 2006/0171605 | A1 | 8/2006 | Watanabe | |
| 2006/0284991 | A1 * | 12/2006 | Ikeda | 348/223.1 |

FOREIGN PATENT DOCUMENTS

| CN | 1885952 A | 12/2006 |
| JP | 6-121332 | 4/1994 |
| JP | 2002-271638 | 9/2002 |
| JP | 2003-189325 | 7/2003 |
| JP | 2004-297650 | 10/2004 |

\* cited by examiner

*Primary Examiner* — Nhan T Tran
*Assistant Examiner* — Yih-Sien Kao
(74) *Attorney, Agent, or Firm* — McGinn IP Law Group, PLLC

(57) ABSTRACT

A specific target included in an image is detected by a specific target detection unit based on a specific target evaluation value representing likeliness of the specific target. Using a first white balance correction value calculation unit for obtaining a first white balance correction value for the region of the image other than the specific target, a second white balance correction value calculation unit for obtaining a second white balance correction value for the specific target region, and a white balance correction value comparison unit for making a comparison between the first and second white balance correction values, white balance in the region other than the specific target is corrected using the first white balance correction value, and white balance in the specific target region is corrected using the second white balance correction value, if the white balance correction values are different from each other.

17 Claims, 14 Drawing Sheets

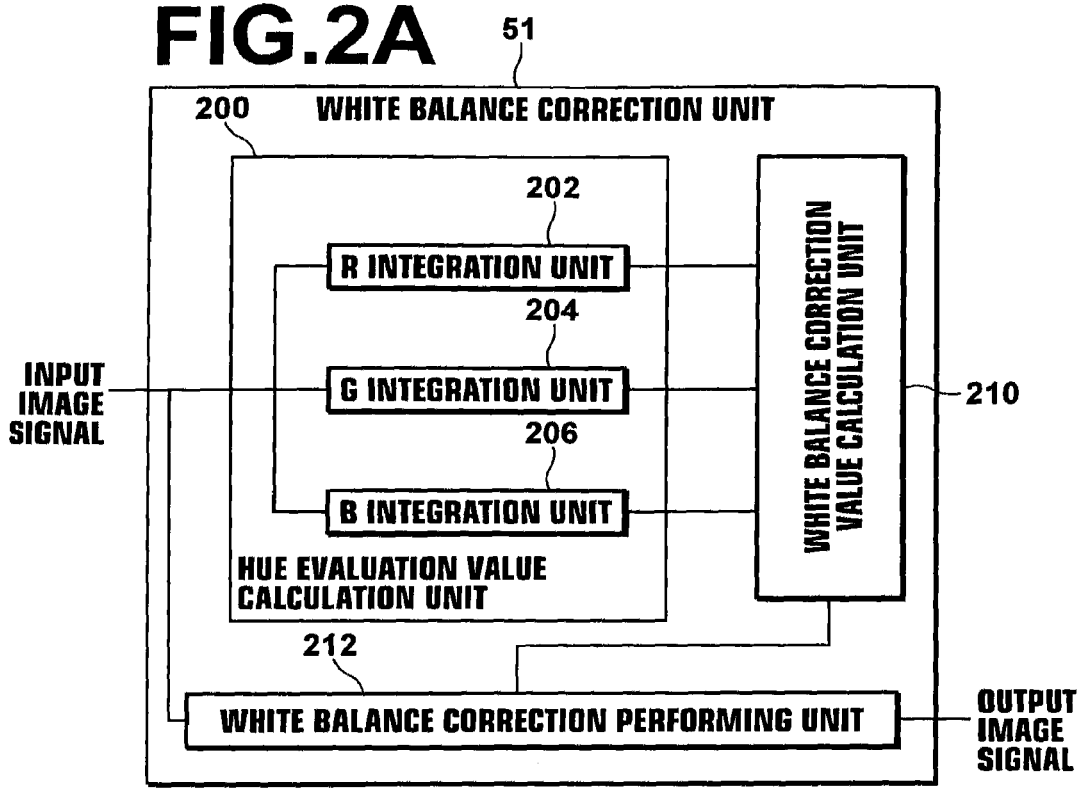
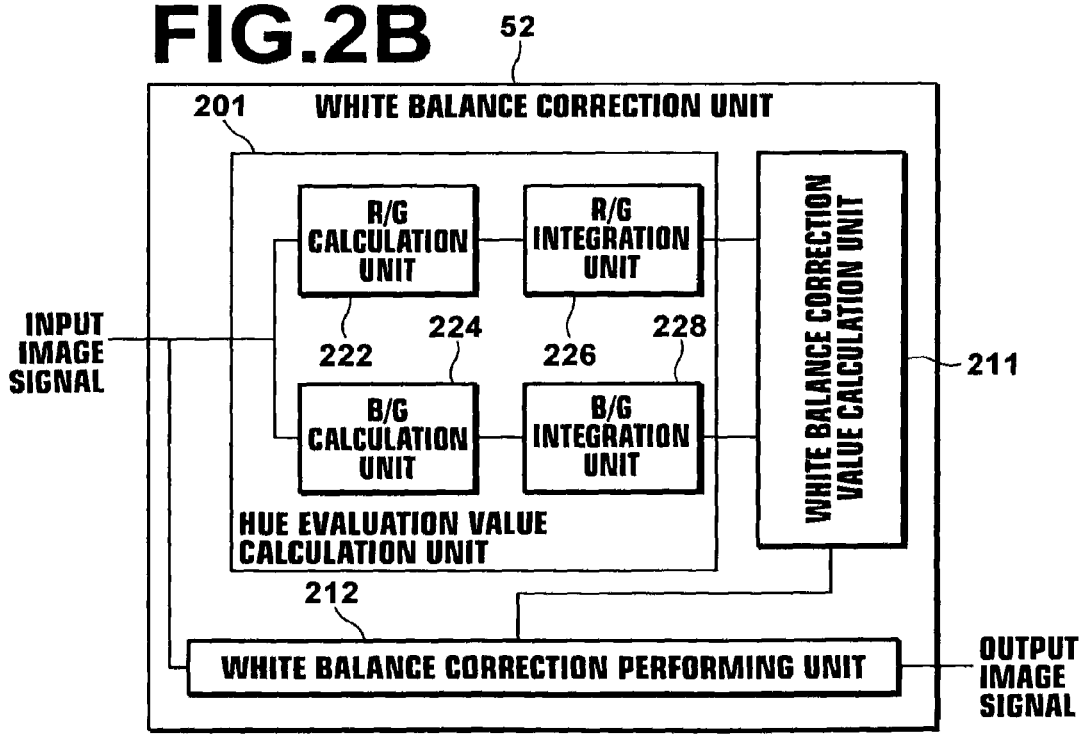

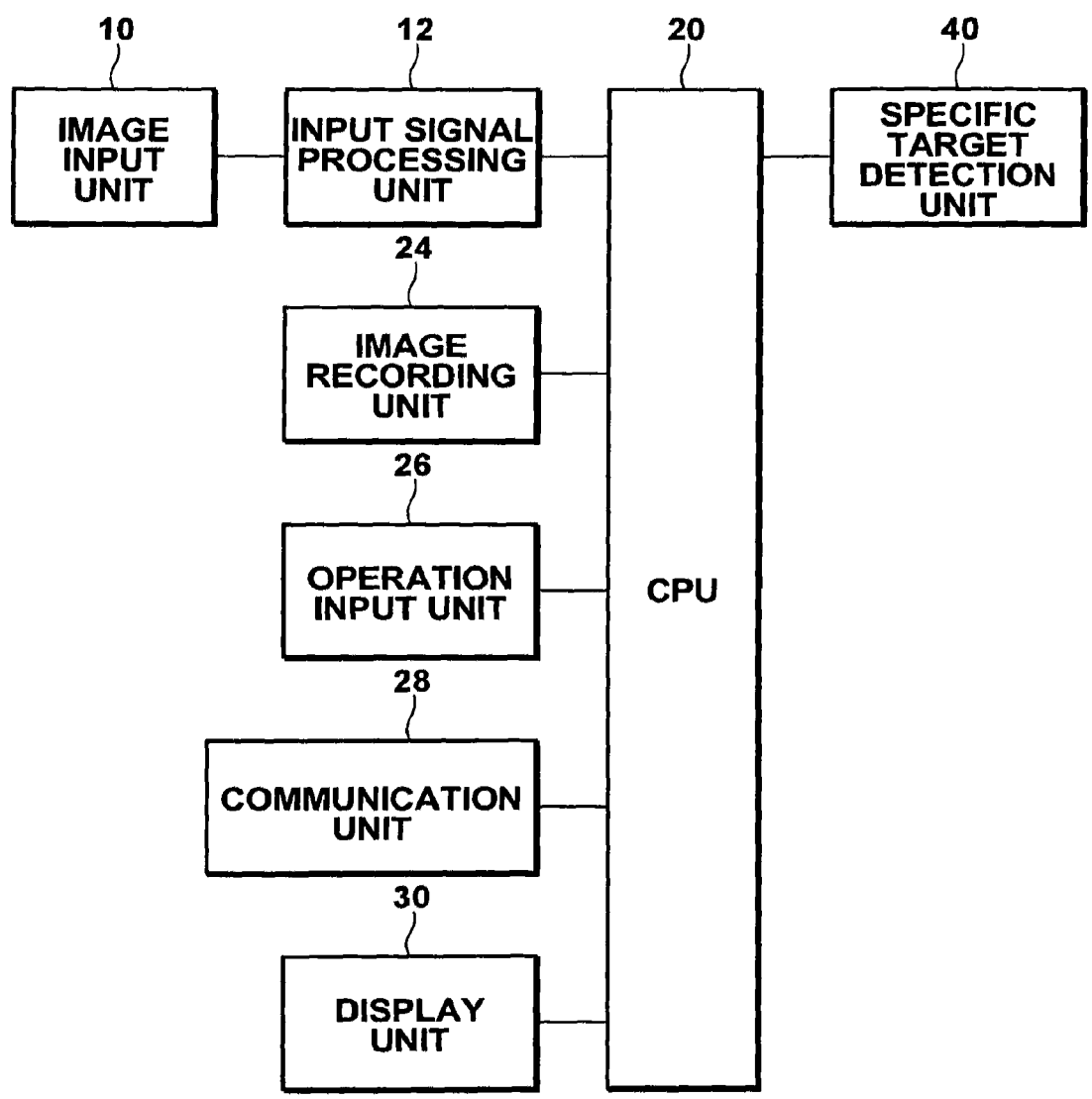

FIG.9A

BLOCK DISCRIMINATION VALUE B(X, Y): ORIGINAL — S902

| 1 | 1 | 1 | 1 | 1 | 1 |
|---|---|---|---|---|---|
| 1 | 1 | 1 | 1 | 1 | 1 |
| 1 | 1 | 2 | 2 | 2 | 2 |
| 1 | 1 | 2 | 2 | 2 | 2 |
| 1 | 1 | 2 | 2 | 2 | 2 |
| 1 | 1 | 1 | 1 | 1 | 1 |
| 1 | 1 | 1 | 1 | 1 | 1 |
| 1 | 1 | 1 | 1 | 1 | 1 |

FIG.9B

LPF — S904

| 1 | 1 | 1 |
|---|---|---|
| 1 | 4 | 1 |
| 1 | 1 | 1 |

BLOCK DISCRIMINATION VALUE B(X, Y): AFTER LPF — S906

| 1 | 1 | 1 | 1 | 1 | 1 |
|---|---|---|---|---|---|
| 1 | 1 | 1 | 1 | 1 | 1 |
| 1 | 1.08 | 1.17 | 1.17 | 1.08 | 1 |
| 1 | 1.17 | 1.58 | 1.58 | 1.17 | 1 |
| 1 | 1.25 | 1.75 | 1.75 | 1.25 | 1 |
| 1 | 1.25 | 1.75 | 2.00 | 1.75 | 1.25 |
| 1 | 1.25 | 1.75 | 2.00 | 1.75 | 1.25 |
| 1 | 1.25 | 1.75 | 2.00 | 1.75 | 1.25 |

WHITE BALANCE CORRECTION APPARATUS AND METHOD

BACKGROUND OF THE INVENTION

1. Field of the Invention

The present invention relates to an apparatus and method for correcting the white balance of an image signal.

2. Description of the Related Art

In photographing devices, such as digital cameras and the like, it is well known that white balance corrections are performed on subject images after they are converted to image signals by the photographing device.

Japanese Unexamined Patent Publication No. 6(1994)-121332 discloses a picture signal processing system that detects a skin color region or a human face from picture signals and performs luminance correction, color correction, and aperture correction only on the detected region. That is, it discloses a technique for improving skin color reproducibility by regarding a skin color region in picture signals as a face region and performing a color correction on the face region. According to the disclosed technique, the improvement of skin color reproducibility is realized by outputting a skin color detection signal representing a skin color region from a comparator according to memory output which is based on the phase and amplitude of R-Y, B-Y and color difference signals, and the level of luminance signal, and controlling the gains of the R-Y, B-Y and color difference signals by a gain control circuit based on the skin color detection signal.

U.S. Patent Application Publication No. 20060171605 discloses an image processing system that extracts the shape of a main subject from image data, then determines a plurality of regions including the region corresponding to the shape of the main subject as weighting regions, and performs exposure correction and white balance correction based on the photometric value, colorimetric value and weighting factor of each of the weighting regions. According to the disclosed technique, the shape of a main subject, such as a person or the like, is extracted from the original image data, then the region of the main subject corresponding to the shape of the main subject is determined as a region for the photometry/colorimetry, a plurality of regions including the main subject region is determined as weighting regions, and a weighting factor is allocated to each of the weighting regions. In the mean time, the entire image plane is divided into a plurality of segments, then a measured value of segment photometry and/or colorimetry is calculated for each of the segments, and the weighting factor is determined for the measured value calculated for each of the segments. Thereafter, exposure correction and/or white balance correction is performed based on the measured value calculated with respect to each of the segments and the weighting factor determined with respect to each of the weighting regions to which the segment having each of the measured values belongs.

Japanese Unexamined Patent Publication No. 2003-189325 discloses an image processing system that realizes favorable image processing by performing face detection and avoiding the use of color information of the face portion in the calculation of white balance to prevent unpleasant white balance causing the face portion to become pale or the like. According to the disclosed technique, the prevention of unpleasant white balance is realized in the following manner. First, a determination is made as to whether or not an imaging device is in face recognition mode, and if it is not in the face recognition mode, the AWB evaluation value obtaining area is specified to the normal area. If it is in the face recognition mode, a face recognition process is performed and a determination is made as to whether or not a face is recognized. If a face is not recognized, the AWB evaluation value obtaining area is specified to the normal area, while a face is recognized the AWB evaluation value obtaining area is moved to an area other than the face. Then, the AWB evaluation value obtaining area is set to obtain an AWB evaluation value and a final AWB gain is set by calculating the AWB value.

The methods described above devise ways to obtain a better image, in particular, for color correction. The technique described in Japanese Unexamined Patent Publication No. 6(1994)-121332 is a technique that detects only a skin color portion for color correction in order to improve human skin color reproducibility. It may improve the skin color reproducibility, but it does not consider a portion other than the skin color portion. Consequently, this might cause, for example, disruption of color balance between the skin color portion of a face and the portion other than the skin color portion, such as the eyes or the like. Further, the technique described in U.S. Patent Application Publication No. 20060171605 performs calculation for exposure correction and white balance correction by changing the weight with respect to the main subject region and the region other than the main subject region and performs corrections on the recorded image. Here, only a single correction value is used for correction and a case where existence of a subject illuminated by a plurality of light sources in an image is not taken into account. Still further, the technique described in Japanese Unexamined Patent Publication No. 2003-189325 obtains information for white balance correction from the region other than the detected face region. It prevent unpleasant white balance causing the face portion to become pale or the like, but still a case where existence of a subject illuminated by a plurality of light sources in an image is not taken into account.

In the mean time, for a low sensitivity digital camera, performance of white balance correction with respect only to the main light source illuminating the main subject may result in an image with a uniform white balance over the entire image plane. For example, white balance correction with respect to the sunlight if outdoor environments or with respect to flash light if indoor environments at night and the flash is used may result in a favorable image. The reason is that the low sensitivity digital camera is unable to capture a weak light amount from a light source other than the main light source. On the other hand, in photography with a high sensitivity digital camera, the digital camera may capture both light amounts from the main light source illuminating a main subject and from a subsidiary light source illuminating the background thereof. In a case where a main subject is imaged with a flash as the main light source under an incandescent lamp light source as a subsidiary light source, the background illuminated by the subsidiary light source is also reproducible. In this case, the flash light as the main light source has a color temperature of about 7000K, while the incandescent lamp as the subsidiary light source has a color temperature of about 3000K. Thus, if the white balance over the entire image is adjusted to the flash light as the main light source, the background illuminated by the subsidiary light source becomes reddish. Further, when the subsidiary light source is an incandescent color fluorescent lamp or the like, a similar problem still arises. The present invention has been developed as a means for solving the problems described above.

SUMMARY OF THE INVENTION

A first white balance correction apparatus of the present invention is an apparatus including:

a specific target detection means for detecting a specific target included in an inputted image signal based on a specific target evaluation value representing likeliness of the specific target;

a first white balance correction means for obtaining a first white balance correction value for the region other than the specific target in an image represented by the inputted image signal, and a second white balance correction means for obtaining a second white balance correction value for the region of the specific target detected by the specific target detection means, wherein, if the first and second white balance correction values are different from each other, white balance in the region other than the specific target is corrected using the first white balance correction value and white balance in the specific target region is corrected using the second white balance correction value. That is, for the region detected as a specific target, white balance is corrected by the second white balance correction means, and for the other region, white balance is corrected by the first white balance correction means. This allows a white balance correction of a subject according to the light source, so that photographing of a natural image is possible even under a plurality of light sources.

A second white balance correction apparatus of the present invention is an apparatus including:

a specific target detection means for detecting a specific target included in an inputted image signal based on a specific target evaluation value representing likeliness of the specific target;

a first white balance correction means for obtaining a first white balance correction value for the region other than the specific target in an image represented by the inputted image signal, and a correction value distribution detection means for dividing the specific target region detected by the specific target detection means into a plurality of segments, obtaining a segment white balance correction value for each of the segments, and detecting a distribution of the segment white balance correction values, wherein: white balance in the region other than the specific target is corrected using the first white balance correction value; and if the distribution of the segment white balance correction values detected by the correction value distribution detection means is determined to be a distribution of a plurality of white balance correction values, white balance of the specific target region is corrected on a segment-by-segment basis using the value of one of the plurality of white balance correction values which is closest to the segment white balance correction value of each of the segments. That is, white balance in the region other than the specific target is corrected using the first white balance correction value, and with respect to the region detected as a specific target, the specific target is divided into a plurality of segments, and the white balance thereof is corrected using the value of one of the plurality of white balance correction values which is closest to the segment white balance correction value of each of the segments.

In the white balance correction apparatuses described above, a human face is generally conceivable as a particular example of the specific target. That is, if the specific target is a face, it is possible to perform a white balance correction on the face portion which does not give uncomfortable feeling by applying the white balance correction described above.

In practical use, the aforementioned white balance correction apparatuses may be mounted on a photographing apparatus to realize a photographing apparatus capable of obtaining an image that has received a white balance correction according to the light source of the subject.

A first white balance correction method of the present invention is a method including the steps of:

detecting a specific target included in an inputted image signal based on a specific target evaluation value representing likeliness of the specific target;

obtaining a first white balance correction value for the region other than the specific target in an image represented by the inputted image signal and a second white balance correction value for the detected specific target region; and if the first and second white balance correction values are different from each other, correcting white balance in the region other than the specific target using the first white balance correction value and correcting white balance in the specific target region using the second white balance correction value.

A second white balance correction method of the present invention is a method including the steps of:

detecting a specific target included in an inputted image signal based on a specific target evaluation value representing likeliness of the specific target;

obtaining a first white balance correction value for the region other than the specific target in an image represented by the inputted image signal;

dividing the detected specific target region into a plurality of segments, obtaining a segment white balance correction value for each of the segments, and detecting a distribution of the segment white balance correction values;

correcting white balance in the region other than the specific target using the first white balance correction value; and if the distribution of the segment white balance correction values is determined to be a distribution of a plurality of white balance correction values, correcting white balance in the specific target region on a segment-by-segment basis using the value of one of the plurality of white balance correction values which is closest to the segment white balance correction value of each of the segments.

According to the present invention, the region of a specific target included in inputted image signals is regarded as a main subject, and a main light source white balance correction value for the main light source that illuminates the main subject and a subsidiary light source white balance correction value for the subsidiary light source that illuminates the region other than the specific target in the image are obtained. If the main light source white balance correction value and the subsidiary light source white balance correction value are different from each other, it is determined that the main light source and the subsidiary light source are different, and an optimum white balance correction is performed on each of the regions. This allows a well color-balanced image as a whole to be obtained even for a subject illuminated by a plurality of types of light sources by optimally controlling the white balance correction values.

Further, even when a main subject is illuminated by a plurality of light sources, white balance correction values may be controlled optimally and a well color-balanced image as a whole may be obtained by dividing the main subject region including the specific target into a plurality of segments, obtaining a segment white balance correction value for each of the segments and performing a correction thereon.

BRIEF DESCRIPTION OF THE DRAWINGS

FIGS. 2A, 2B respectively illustrate first and second examples of the internal configurations of the white balance correction unit 50 according to the present invention.

FIG. 6 is a block diagram of an imaging apparatus 2 as an embodiment of the white balance correction means according to the present invention, illustrating the internal configuration thereof.

FIGS. 9A, 9B, 9C illustrate an example case where a low-pass filter is applied to block determination values B(X, Y).

DESCRIPTION OF THE PREFERRED EMBODIMENTS

Hereinafter, exemplary embodiments of the photographing apparatus and method according to the present invention will be described with reference to the accompanying drawings.

Figure 1:
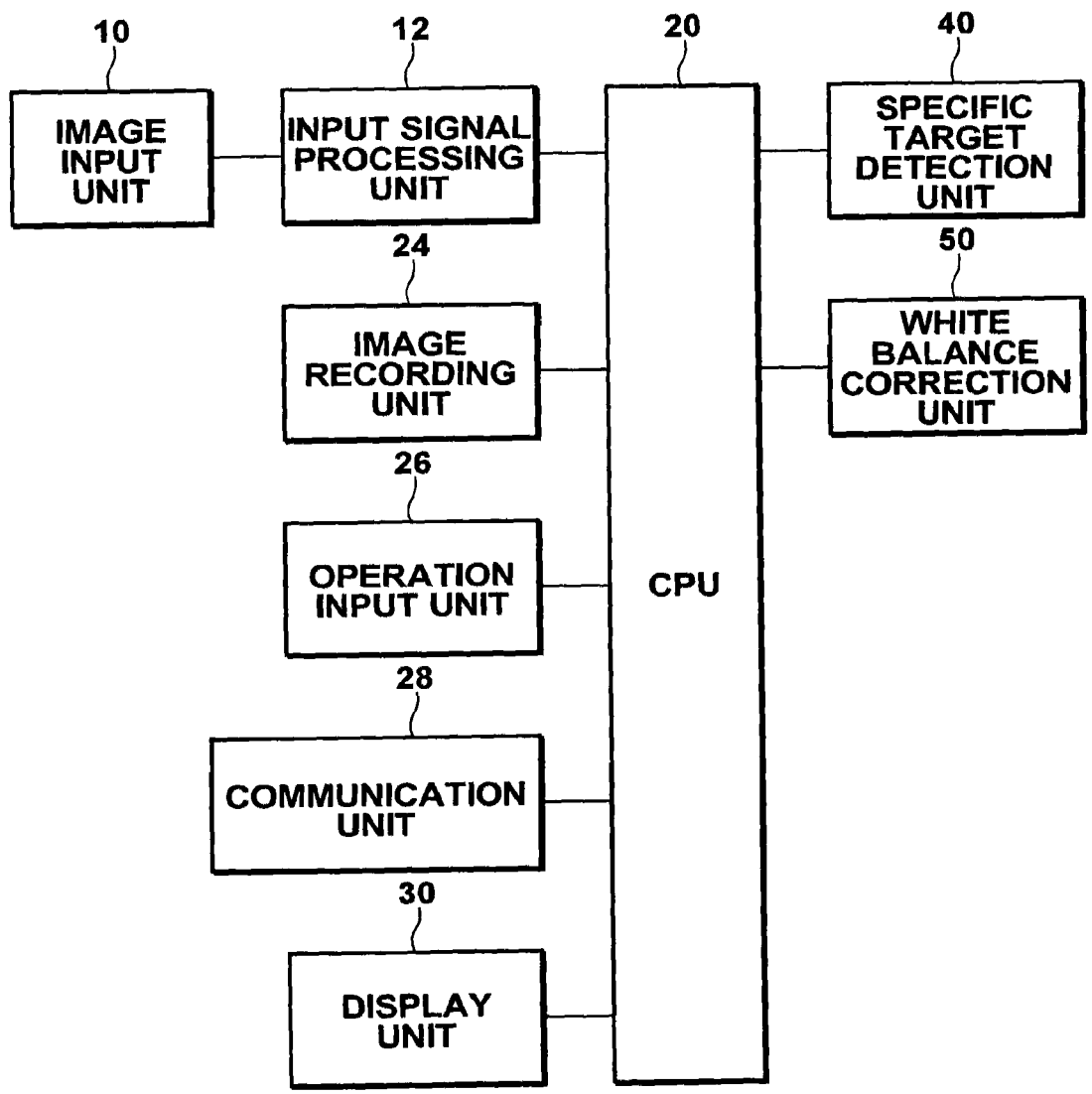
FIG. 1 is a block diagram of an imaging apparatus 1 as an embodiment of the white balance correction means according to the present invention, illustrating the internal configuration thereof.

FIG. 1 is a block diagram of an imaging apparatus 1 as an embodiment of the white balance correction means according to the present invention, illustrating the internal configuration thereof.

In FIG. 1, an imaging apparatus 1 includes an image input unit 10, an input signal processing unit 12, a CPU 20, an image recording unit 24, an operation input unit 26, a communication unit 28, a display unit 30, a specific target detection unit 40, and a white balance correction unit 50. The CPU 20 controls each of the units according to an instruction from an operator through the operation input unit 26 or communication unit 28.

Where the image input unit 10 is configured as the imaging unit, it receives an optical image incident from outside, converts to an image signal, and outputs using a lens, an image sensor, and the like. It may include a flash or an illumination means as an auxiliary light emission unit used under low luminance environments as required. If the image input unit 10 is configured as an external signal input unit for inputting an image signal from outside, the configuration of the image input unit 10 may overlap with that of the image recording unit 24 or communication unit 28. That is, image input is performed using the recording medium interface of the image recording unit 24 or the communication unit 28. Although not shown, the image input unit 10 may further include an auxiliary light projection unit for projecting auxiliary light when photographing, a sound recording unit for recording sound signals such as voices, environmental sounds, music, and the like, and a sound playback unit for playing back the voices or the like, or outputting warning sounds.

The input signal processing unit 12 processes the image signal described above and passes to the CPU 20. The image processing here depends on the output image signal mode intended by the operator. According to the photographing mode, it performs offset correction, color matrixing, gradation conversion, demosaicing, contour enhancement, compression, and the like on the image signal. The photographing mode includes still image photographing mode, motion image photographing mode, and the like. Further, the still image photographing mode and motion image photographing mode may include a plurality of photographing modes respectively.

The image recording unit 24 records the inputted image signal. The recording medium may be either an internal recording medium or an external storage medium as typified by a memory card. It may include both of them. The image recording unit 24 may record inputted or generated information (data), as well as the image signal. Although it is named "recording unit", it allows reading as well as recording, and it is possible to send data read out therefrom from the communication unit 28 through the CPU 20, or to display the data on the display unit 30.

The operation input unit 26 includes operation switches for operating the imaging apparatus 1 including the power switch, shutter switch. The operator may give instructions to the imaging apparatus 1 from the operation input unit 26, and thereby the operator may operate the imaging apparatus 1.

The communication unit 28 is a means provided for the imaging apparatus 1 for outside communication. As for the communication method, the communication unit 28 may use wire communication, wireless communication, optical communication, or the like as required. Further, it may select a communication protocol as required. The communication unit 28 may send information to outside and also receive information from outside.

The specific target detection unit 40, as the specific target detection means, detects an specific target by detecting a characteristic portion of a subject, such as the head, face, eyes, nose, mouth, sunglasses, or the like from an image signal inputted from the image input unit 10 or recorded in the image recording unit 24 and discriminating a characteristic point or pattern. As for the specific method for detecting the specific target, any known method may be used, such as face detection method through edge detection or shape pattern detection, characteristic point vector approximation method in which characteristic points, which are the coordinates of a characteristic portion, are vectorized and the approximated characteristic vector is detected, or region detection method through hue detection or skin color detection. As for the specific targets, the entirety of a human body, a human face, a pet, and the like may be included. When a specific target is detected, the specific target detection unit 40 outputs to the CPU 20 information which indicates the area of the specific target which may be used for recording or display, as well as white balance correction.

The white balance correction unit 50, as the white balance correction means, determines a white balance correction value for a subject from an image signal inputted from the image input unit 10. The white balance correction unit will be described in detail later.

In a photographing apparatus, image recording is normally initiated by the shutter button constituting a part of the operation input unit 26. If it is recording of a still image, the shutter button is depressed to instruct the recording of the single still image, or if it is continuous recording, still images are recorded continuously while the shutter button is being depressed (ON state). If it is motion image recording, the recording is generally initiated when the shutter button is depressed once and terminated when the shutter button is depressed again.

FIG. 2A is a block diagram of a white balance correction unit 51, illustrating a first example of the internal configuration of the white balance correction unit 50 according to the present invention. FIG. 2B is a block diagram of a white balance correction unit 52, illustrating a second example of the internal configuration of the white balance correction unit 50 according to the present invention. These internal configurations will be described in succession.

Each of the white balance correction units 51 and 52 calculates a white balance correction value for a subject from an image signal inputted from the image input unit 10. For that purpose, a hue evaluation value is calculated by each of hue evaluation value calculation units 200 and 201.

One of the specific hue evaluation value calculation methods is a method in which inputted image signals are integrated with respect to each of the three primary light colors of R G B, as illustrated in FIG. 2A. The colors R, G, and B in image signals inputted through the image input unit 10 or the communication unit 28 are integrated by an R integration unit 202, a G integration unit 204, and a B integration unit 206 respectively, and passed to a white balance correction value calculation means 210 as hue evaluation values. The white balance correction value calculation means 210 calculates a white balance correction value based on the hue evaluation values. A white balance correction performing unit 212 converts the inputted image signal using the white balance correction value and provides an output image signal.

Another hue evaluation value calculation method is a method in which the ratio of color R to color G is calculated by an R/G calculation unit 222 and the ratio of color B to color G is calculated by a B/G calculation unit 224, then the R/G is integrated by an R/G integration unit 226 and the B/G is integrated by an B/G integration unit 228, and these integrated values are used as hue evaluation values, as illustrated in FIG. 2B.

In the description of FIGS. 2A, 2B, the hue evaluation values and white balance correction value are calculated for the entire image screen. Alternatively, the inputted image signal maybe divided into a plurality of blocks, and the hue evaluation value may be calculated with respect to each of the blocks.

<First Embodiment>

Figure 3:
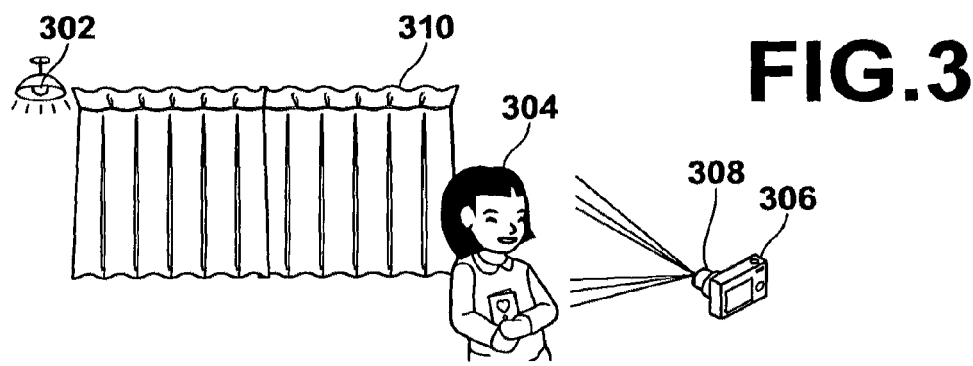
FIG. 3 illustrates a first example subject illuminated by a plurality of light sources.

Hereinafter, a first embodiment will be described. FIG. 3 illustrates a first example subject illuminated by a plurality of light sources. The white balance correction for the picture signals obtained under such circumstances will be described as an example. The example subject is an indoor room illuminated by a ceiling light 302 of incandescent lamp. When photographing a person, which is a main subject 304, a built-in flash or an accessory flash to a photographing device 306 is sometimes used. Here, a background curtain 310 and the like are illuminated by the ceiling light 302, and the main subject 304 is illuminated by the flash 308, thus creating an area within the subject illuminated by a plurality of light sources.

Figure 4A:
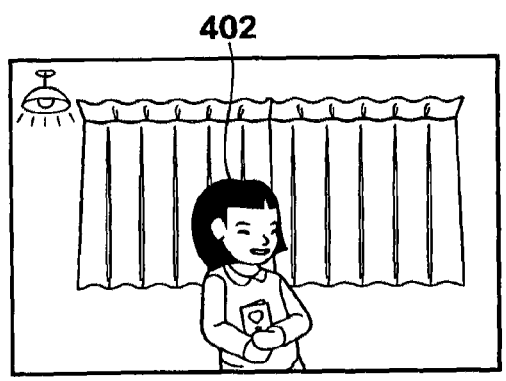
FIGS. 4A, 4B respectively illustrate a photograph image of the first example subject illuminated by a plurality of light sources, and a white balance correction area.
Figure 4B:
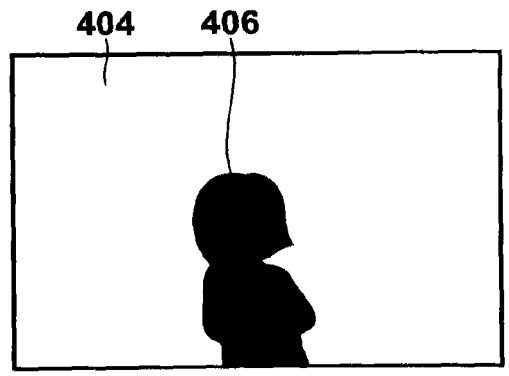
Figure 5A:
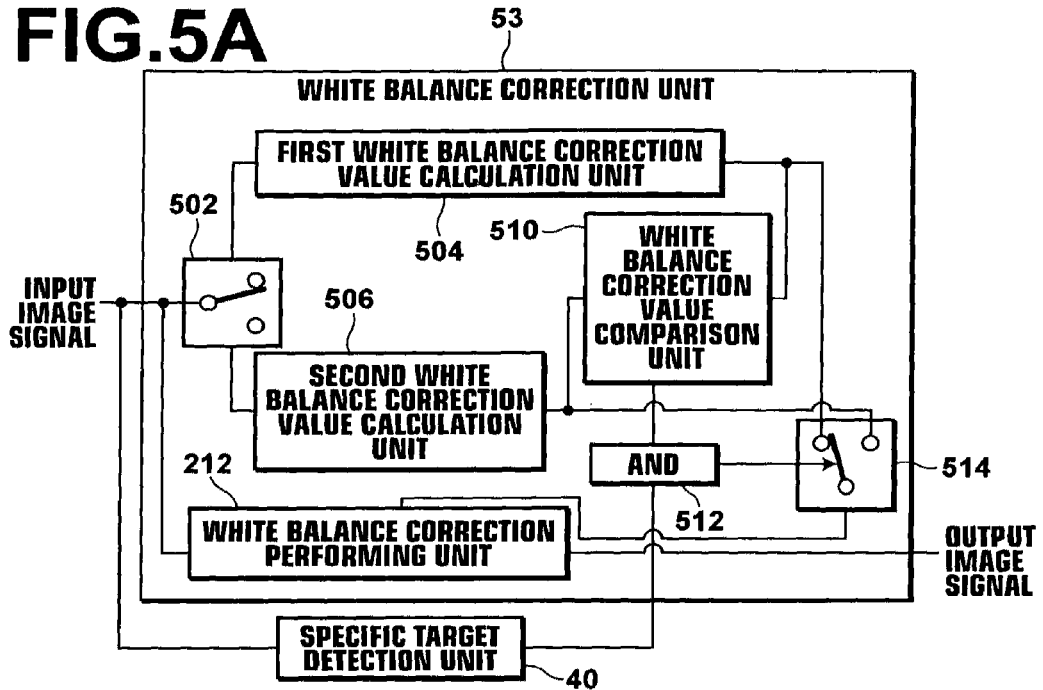
FIGS. 5A, 5B illustrate example configurations of white balance correction units as embodiments of the white balance correction means according to the present invention.
Figure 5B:
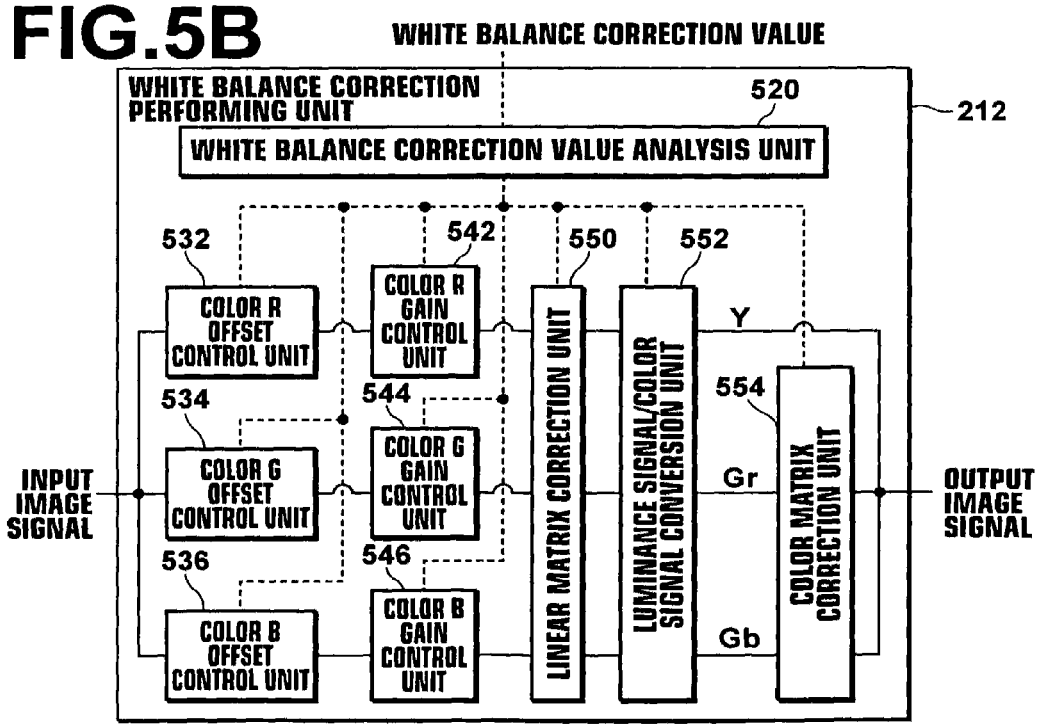

FIG. 4A illustrates a photograph image of the first example subject illuminated by a plurality of light sources shown in FIG. 3, and FIG. 4B illustrates an specific target region 406 detected from FIG. 4A. FIG. 5A illustrates an example configuration of the white balance correction unit as an embodiment of the white balance correction means of the present invention, and FIG. 5B illustrates a detailed example of the white balance correction performing unit. The embodiment of the white balance correction will be described using FIG. 5 and with reference to FIG. 4 as required.

FIG. 5A illustrates an example configuration of the white balance correction unit as an embodiment of the white balance correction means of the present invention. A specific target 402 (a main subject person in the present embodiment) is detected from image signals of a photograph image like that shown in FIG. 4A by the specific target detection unit 40 shown in FIG. 5A. The specific target detection unit 40 is capable of outputting the specific target region of the image signals.

In order to determine whether or not a light source illuminating the specific target region corresponds to a light source illuminating the region other than the specific target region, the inputted image signals are sorted into the signals of a region 404 other than the specific target region shown in FIG. 4B and the signals of the specific target region 406. The specific procedure is as follows. The specific target detection unit 40 outputs "H" at the specific target region of the image signals and outputs "L" at the other region. A white balance input selection means 502 controls the input signals so as to be inputted to a first white balance correction value calculation unit 504 when the output of the specific target detection means 40 is "L" and inputted to a second white balance correction value calculation unit 506 when the output of the specific target detection means 40 is "H".

Using image signals selectively inputted by the white balance input selection means 502, the first white balance value calculation unit 504 calculates a first white balance correction value, and the second white balance value calculation unit 506 calculates a second white balance correction value. A white balance correction value comparison unit 510 compares the calculated first white balance correction value with the second white balance correction value to determine whether the light source is single or plural. The white balance correction value comparison unit 510 outputs "L" to a logical AND unit when the comparison result does not agree, and outputs "H" to the logical AND unit when the comparison result agrees. When the comparison result does not agree, it means that the light source is plural as in the example shown in FIG. 4, and if the light source is single, the comparison result will agree.

The term "agree" is used here, but an arrangement may be adopted, for example, in which, if the statistical error is 5%, a certain value range including the statistical error (e.g., about 10%, which is double the statistical error) is set for the first and second white balance correction values and a determination is made as to whether or not the value ranges correspond to each other. The determination of correspondence including the statistical error may reduce the influence of the color of the subject and the like.

As described, the specific target detection unit 40 outputs "H" at the specific target region of the image signals and outputs "L" at the other region. The logical AND unit outputs "H" to a white balance correction value selection unit 514 only when the outputs of the specific target detection unit 40 and white balance correction value comparison unit 510 are "H" (logical AND conditions). That is, it outputs "H" when the first and second white balance correction values differ from each other, and at the specific target region.

The white balance correction value selection unit 514 selects the first white balance correction value when the output of the logical AND unit 512 is "L" or the second white balance correction value when the output of the logical AND unit 512 is "H", and sends to the white balance correction performing unit 212. That is, when the first and second white balance correction values agree to each other, the first white balance correction value is selected, and a white balance correction is performed on the inputted image signal. If the first and second white balance correction values differ from each other, the following are performed. For the region of the inputted image signal other than the specific target region 402, the first white balance correction value is selected to perform a white balance correction thereon, and for the specific target region 402, the second white balance correction value is selected to perform a white balance correction thereon.

Even in a case where a specific target region is illuminated by a light source which is different from that illuminating the region other than the specific target region (background region), white balance corrections may be performed according to the light sources, so that a natural photograph image may be obtained even under a plurality of light sources.

Further, the white balance correction may be performed with respect to each of the light sources, so that it is possible to keep the atmosphere created by one light source (moderate correction), while a full white balance correction is performed for another light source. For example, considering a case in which a main subject is in a room illuminated by an incandescent light source and outdoor scenery viewed from a background window is illuminated by the sun. If a slightly moderate white balance correction is performed on the specific target illuminated by the incandescent light source to keep redness, while a full white balance correction is performed on the outdoor scenery viewed from the background window, the atmosphere of the indoor subject and the atmosphere of the outdoor scenery viewed from the background window may be maintained.

Further, when a light source illuminating a specific target region and a light source illuminating the background region differ from each other, it is possible to adjust the color tone of the specific subject to that of background region. Still further, the use of a hue evaluation value calculation result and an exposure condition calculation result not described here allows the light source illuminating the subject to be determined. For example, it is possible to determine the light source illuminating a subject and the light source illuminating the background by dividing the subject image into a plurality of regions and estimating the light source with respect to each of the regions. Here, it is assumed that the specific target region is a main subject, and a determination is made that the main subject region is illuminated by a flash and the background region is illuminated by an incandescent lamp. A moderate white balance correction is performed on the background region to keep the redness of the incandescent light, while a white balance correction that causes a slight red-eye is performed on the main subject region so that the color tone of the main subject region matches with that of the background region. Such correction may provide an image as if it is obtained under only the incandescent light, even though flash photographing is performed.

Next, the white balance correction performing unit will be described with reference to FIG. 5B. As described earlier, the white balance correction performing unit is a unit that performs white balance correction on the inputted image signals.

First, a white balance correction value analysis unit 520 analyzes the white balance correction value sent from the white balance correction value selection unit 514. Then, it sends processing content (correction content) to each processing unit to be described later according to the analysis result.

The white balance correction performing unit includes various control units, processing units, and conversion units shown in FIG. 5B. That is, it includes along the signal flow from the left in FIG. 5B: an offset control unit (a color R offset control unit 532, a color G offset control unit 534, and a color B offset control unit 536), a gain control unit (a color R gain control unit 542, a color G gain control unit 544, and a color B gain control unit 546), a linear matrix correction unit 550, a luminance signal/color signal conversion unit 552 (which is a conversion unit for inputting color (RGB) image signals to a color matrix correction unit 554), and the color matrix correction unit 554. It is possible to perform a white balance correction using all of the control units and processing units or using some of the control units and processing units. Further, the white balance correction performing unit may not include all of the control units and processing units as long as identical white balance correction is possible. For example, some of the processing units may be included in the input signal processing unit 12.

The use of these control units and processing units allows, for example, control of only intermediate color gradations, control of only highlight gradations, or fine color control in addition to simple gain control, thereby more sophisticated white balance control may be performed.

In the mean time, the specific target to be detected is not limited to one target. Accordingly, where the number of specific targets is two or more, it is desirable that the number of white balance correction value calculation units corresponding to the number of specific targets plus one (for the portion other than the specific targets) is provided. Although the number of the white balance correction value calculation units and the number of correction units are increased, the overall operation is similar to that described above.

Further, it is not necessary that the white balance correction is performed in a single continuous sequence, and may be performed through a plurality of operations. For example, initially a specific target is detected from input image signals and white balance correction values are calculated, and then white balance corrections are performed on the input image signals. Still further, these operations may not be performed continuously.

<Second Embodiment>

In the first embodiment, the white balance correction unit 50 is formed by hardware. But it may be embodied by software operating on the CPU 20. This is shown in FIG. 6 and Figures following thereto, and will be described as a second embodiment.

FIG. 6 is a block diagram of an imaging apparatus 2 as an embodiment of the white balance correction means according to the present invention, illustrating the internal configuration thereof. The imaging apparatus 2 shown in FIG. 6 does not include the white balance correction unit 50 shown in FIG. 1, but the identical function is realized by the software operating on the CPU 20. The other portion is identical to that shown in FIG. 1, and it will not be elaborated upon further here.

Figure 7:
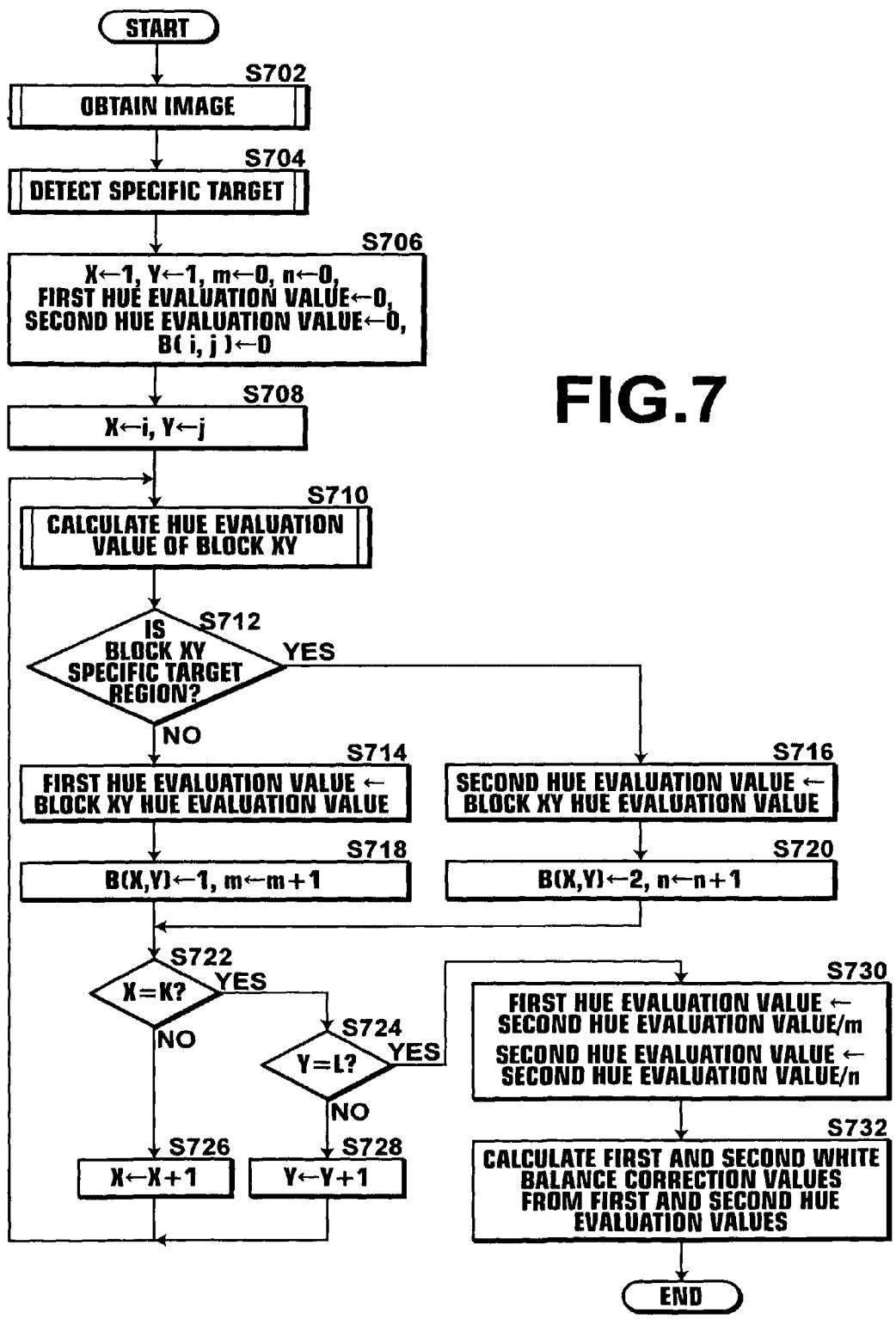
FIG. 7 is a flowchart as a second embodiment of the white balance correction value calculation means.

FIG. 7 is a flowchart as an embodiment of the white balance correction value calculation means according to the present embodiment. Here, due to software processing, image signals are divided into K blocks in the x direction, and L blocks in the y direction.

First, in step S702, image signals are obtained. Then, in step S704, a specific target is detected from the obtained image signals. The detection of the specific target may be performed using the specific target detection unit 40 or by software operating on the CPU 20. The use of the specific target detection unit 40 will result in an increased processing speed by the dedicated hardware, while the use of the software will provide a flexible system configuration (e.g., coefficient or algorithm may be updated easily). Thereafter, in step S706, coefficients used for the subsequent processing are initialized. The x-direction counter X and y-direction counter Y are set to the initial value of "1", then the first hue evaluation value block counter "m" and second hue evaluation value block counter "n" are set to the initial value of "0", and the initial value of "0" is substituted to the first hue evaluation value, second hue evaluation value, and block discrimination value B(i, j). Note that the B(i, j) is a matrix ranging from B(1, 1) to B(K, L), and the block discrimination value B(i, j) is initialized by incrementing counters i and j (not shown).

Next, the processing is initiated. In step S710, the hue evaluation value of a block XY represented by block coordinates (X, Y) is calculated. The calculation of the hue evaluation value described in the first embodiment is performed by the software. Thereafter, in step S712, a determination is made as to whether or not the block XY is the specific target region. If the block XY is not the specific target region, the process proceeds to step S714 where the hue evaluation value of the block XY is substituted to the first hue evaluation value. Then, in step S718, a value of "1" which indicates the first hue evaluation value is substituted to the block discrimination value B (X, Y), and the first hue evaluation value block counter "m" is incremented. If the block XY is determined to be the specific target region in step S712, the hue evaluation value of the block XY is substituted to the second hue evaluation value in step S716. Then, in step S720, a value of "2" which indicates the second hue evaluation value is substituted to the block discrimination value B (X, Y), and the second hue evaluation value block counter "n" is incremented.

After step S718 or S720, a determination is made in step S722 as to whether or not the X counter is K, that is, whether or not the block XY is the final block in the X direction. If X≠K, the counter X is incremented in step S726, and the process returns to step S710. If X=K in step S722, a determination is made in step S724 as to whether or not the counter Y is L, that is, whether or not the block XY is the final block in the Y direction. If Y≠L, the counter Y is incremented in step S728, and the process returns to step S710. If Y=L in step S724, the process proceeds to step S730 where a value obtained by dividing the first hue evaluation value by the first hue evaluation value block counter m is determined to be a new first hue evaluation value, and a value obtained by dividing the second hue evaluation value by the second hue evaluation value block counter n is determined to be a new second hue evaluation value. That is, in step S730, each of the evaluation values is normalized by dividing each evaluation value by the number of blocks for which the evaluation value is calculated. Here, the hue evaluation values calculated for the respective blocks are simply averaged, but other statistical methods such as a method for obtaining the median value, a method for obtaining the mode value, or the like may also be used.

Thereafter, in step S732, a first white balance correction value is calculated from the first hue evaluation value, and a second white balance correction value is calculated from the second hue evaluation value, and after that the process is completed. By the steps described above, that is, by the software, the first and second white balance correction values may be calculated. Note that not all of the process steps need to be performed by the software, and some of them may be replaced by hardware.

In FIG. 7, the description has been made of a case in which the calculation of the white balance correction value is separated depending upon whether or not the block is a specific target. Where the specific target is plural, it is desirable that the number of white balance correction values is increased accordingly. For example, if three targets are detected as the specific target, then it is desirable to use four white balance correction values, three for the three target regions and one for the region other than the specific target regions. Even in a case where the specific target or type of light source amounts to a large number, the software processing may handle it flexibly.

Figure 8:
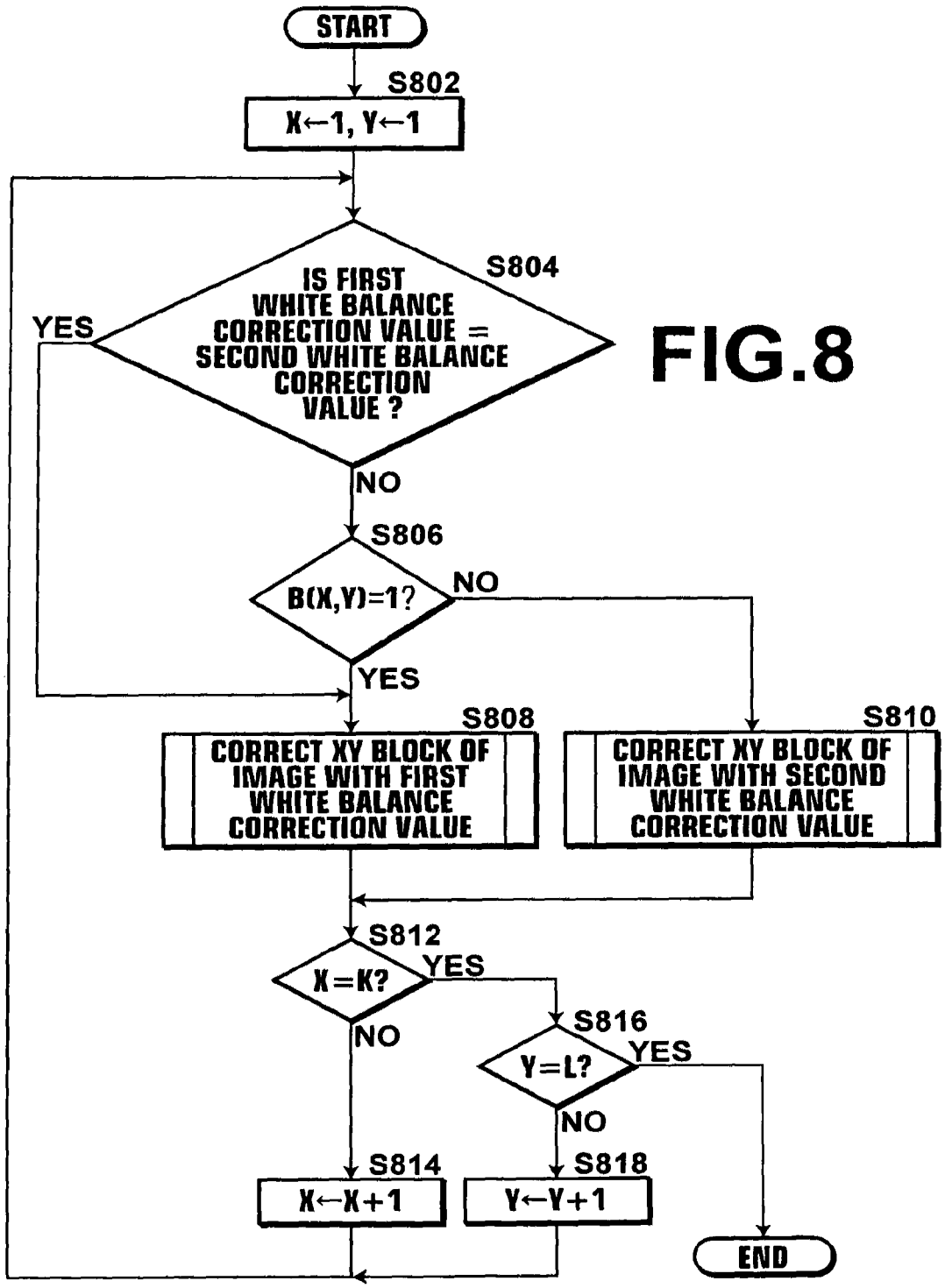
FIG. 8 is a flowchart of a white balance correction value correction means of the present invention as a second embodiment.
Figure 10:
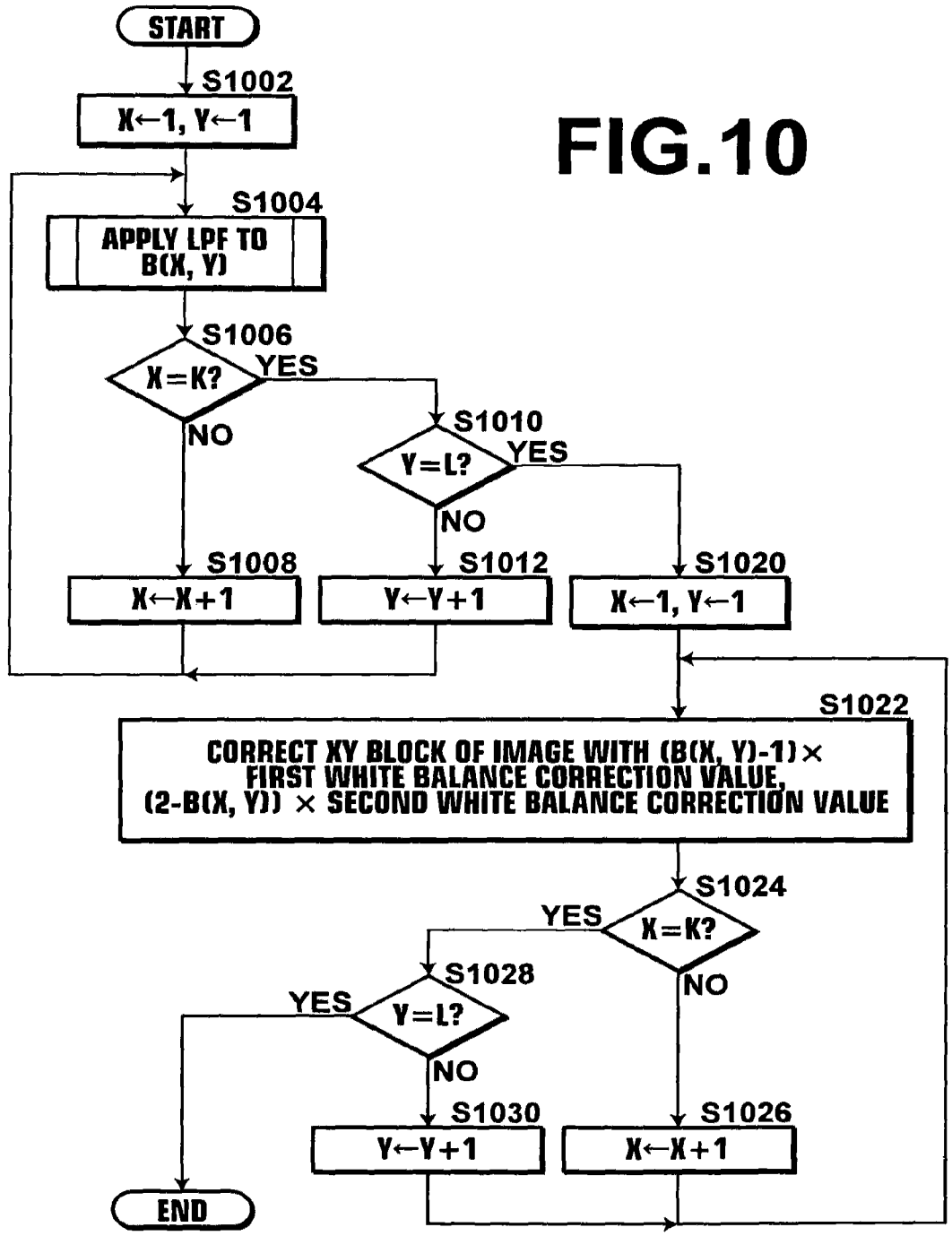
FIG. 10 illustrates a modification of the white balance correction value correction means of the present invention.

FIG. 8 is a flowchart of the white balance correction value correction means of the present invention as a second embodiment. It illustrates an example when performing a white balance correction using the white balance correction values calculated by the white balance correction value calculation means of the present invention shown in FIG. 7. Due to software processing, image signals are divided into K blocks in the x direction, and L blocks in the y direction as in the white balance correction value calculation means of the present invention shown in FIG. 7.

First, in step S802, coefficients to be used in the subsequent steps are initialized. The x-direction counter X and y-direction counter Y are set to the initial value of "1".

Then, the processing is initiated. In step S804, a determination is made as to whether or not the first and second white balance correction values agree to each other. Here, it is described that the agreement is determined. But, for example, if the statistical error is 5%, a certain value range including the statistical error (e.g., about 10%, which is double the statistical error) may be allocated to the first and second white balance correction values and a determination may be made to see if there are value ranges that agree to each other. This allows an error arising from the hue or the like of the subject to be eliminated.

If the first and second white balance correction values do not agree to each other, the process proceeds to step S806 where a determination is made as to whether or not the block discrimination value B (X, Y) is "1". If the block discrimination value B (X, Y) is "1", then it indicates the first hue evaluation value, so the process proceeds to step S808 where the XY block of the image signal is corrected with the first white balance correction value. If the block discrimination value B (X, Y) is not "1", then it indicates the second hue evaluation value, so that the process proceeds to step S810 where the XY block of the image signal is corrected with the second white balance correction value.

After step S808 or S810, a determination is made in step S812 as to whether or not the X counter is K, that is, whether or not the block XY is the final block in the X direction. If X≠K, the counter X is incremented in step S814, and the process returns to step S804. If X≠K in step S812, a determination is made in step S816 as to whether or not the counter Y is L, that is, whether or not the block XY is the final block in the Y direction. If Y≠L, the counter Y is incremented in step S818, and the process returns to step S804. If Y=L in step S816, the process is terminated.

Through the steps described above, the white balance correction may be performed with software using the first or second white balance correction value depending on the conditions. Note that not all of the process steps need to be performed by the software, and some of them may be replaced by hardware.

In FIG. 8, the description has been made of a case in which the number of white balance correction values is only two, that is, the first and second correction values. As mentioned in the description of FIG. 7, where the number of light sources increases, the number of white balance correction values is also increased, so that the number of white balance correction values becomes more than two. If such is the case, it is desirable that the number of white balance correction process steps is increased according to the number. Even in a case where the specific target or type of light source amounts to a large number, the software processing may handle it flexibly.

<Example Modification of the Second Embodiment>

In the second embodiment, the use of the first or second white balance correction value is determined with respect to each block (step S806 in FIG. 8). It is possible, however, that an intermediate region between the specific target region and the region other than the specific target region may exist. If such is the case, the use of a white balance correction value according to the intermediate region allows a more effective white balance correction. This will be described as an example modification of the second embodiment.

FIGS. 9A to 9C illustrate an example case in which a low-pass filter is applied to the block discrimination value B(X,Y). As described earlier, the block discrimination value B(X, Y) is set to "1" if the block is the first hue evaluation value calculation region, or set to "2" if the block is the second hue evaluation value calculation region. The first or second white balance correction value is applied according to the first or second hue region, so that these maybe deemed as the regions representing the white balance correction regions. Here it is assumed that the block discrimination value B(X,Y) is like that shown in FIG. 9A. Twelve blocks located slightly on the right side of the center are the correction regions with the second white balance correction value, and the rest of the blocks are the correction regions with the first white balance correction value.

In order to make the first and second white balance correction regions continuous, a low-pass filter (LPF) is applied to the block discrimination value B(X, Y). An example LPF is illustrated in FIG. 9B, but not limited to this. The example LPF is a LPF with a coefficient of 4/12 with respect to the center value (original value) and a coefficient of 1/12 with respect to the peripheral values. Application of the LPF to FIG. 9A results in FIG. 9C. That is, in FIG. 9A, the respective regions take the block discrimination value B(X,Y) of only "1" or "2", while in FIG. 9C, they take continuous values from "1" to "2".

By performing such processing, it is possible to make the boundary between the specific target region and the background region less noticeable.

<Third Embodiment>

Figure 11:
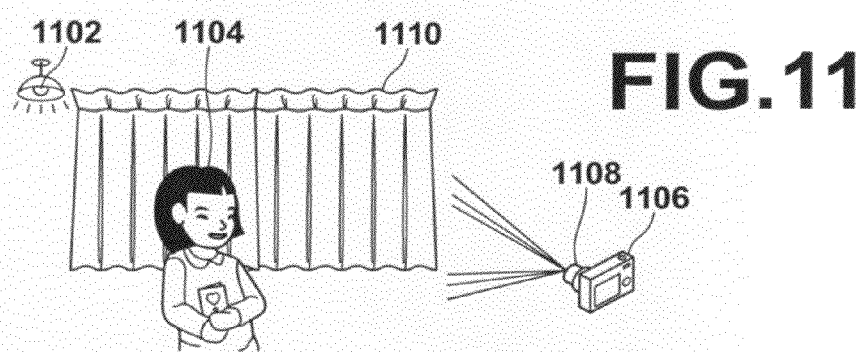
FIG. 11 illustrates a second example subject illuminated by a plurality of light sources.

FIG. 11 illustrates a second example subject illuminated by a plurality of light sources. The subject is a room illuminated by a ceiling light 1102 of incandescent lamp. When photographing a person, which is a main subject 1104, a built-in flash 1108 or an accessory flash to a photographing device 1106 is sometimes used. Here, a background curtain 1110 and the like are illuminated by the ceiling light 1102. The main subject 1104 is illuminated by the ceiling light 1102 and also by the flash 1108. This creates a region within the subject illuminated by a plurality of light sources. In particular, when the main subject 1104 is illuminated by a plurality of light sources, an appropriate white balance correction is desired to be performed according to the light sources. The present embodiment described hereinbelow illustrates an example white balance correction appropriate for such cases.

Figure 12A:
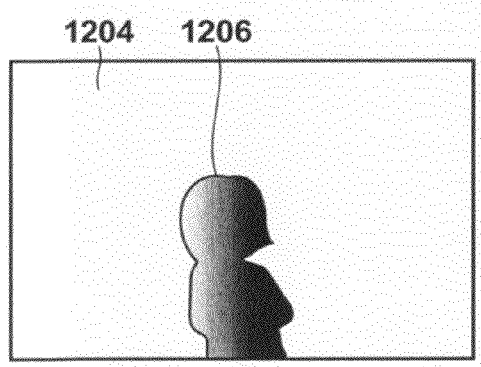
FIGS. 12A, 12B respectively illustrate a photograph image of the second example subject illuminated by a plurality of light sources, and a white balance correction area.
Figure 12B:
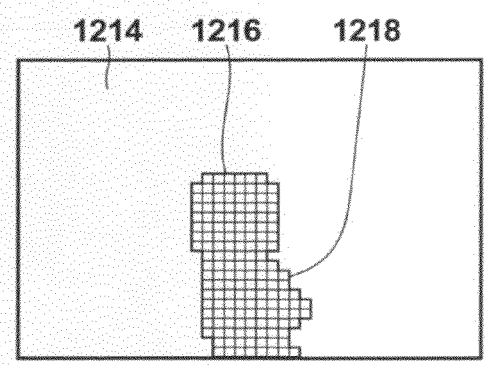
Figure 13:
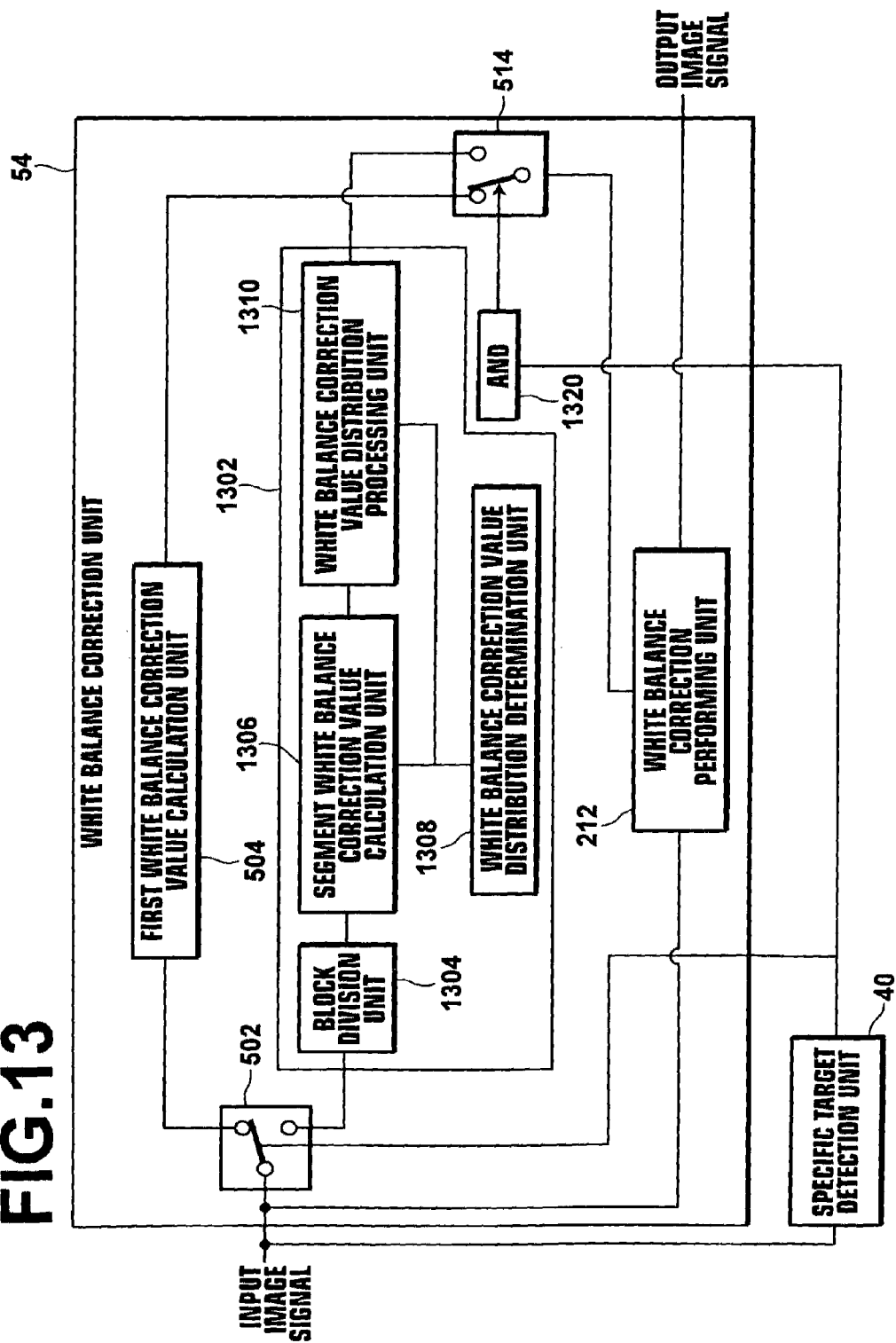
FIG. 13 illustrates an alternative configuration of a white balance correction unit as an embodiment of the white balance correction means according to the present invention.

FIGS. 12A, 12B illustrate a white balance correction area of a recorded image of a second example subject illuminated by a plurality of light sources. FIG. 13 illustrates an example configuration of the white balance correction unit as an embodiment of the white balance correction means of the present invention. The embodiment will be described using FIG. 13 and with reference to FIGS. 12A, 12B as required. In FIG. 13, components identical to those shown in FIGS. 5A, 5B are given the same reference numerals.

FIG. 12A illustrates a specific target 1206 detected from a recorded image (in the present embodiment, a main subject is detected as the specific subject). The image of the main subject person includes a region illuminated by the incandescent lamp 1102 (indicated in white) and a region illuminated by the flash 1108 (indicated in black).

Inputted image signals are switched between a region 1214 other than the particular target region and the particular target region 1216 by the white balance input selection means 502. The specific target detection unit 40 outputs "H" at the specific target region of the image signals and outputs "L" at the other region. The white balance input selection means 502 controls the input signals so as to be inputted to the first white balance correction value calculation unit 504 when the output of the specific target detection means 40 is "L" and inputted to a segment white balance correction value calculation unit 1302 when the output of the specific target detection means 40 is "H".

The first white balance correction value calculation unit 504 calculates the first white balance correction value. The segment white balance correction value calculation unit 1302 calculates the white balance correction value of each divided block (e.g., block 1218) of the specific target region 1206.

First, the inputted image signals are divided into small blocks by a block division unit 1304. The specific target region 1216 formed of blocks does not exactly correspond to the detected specific target region 1206, but the difference between them may be reduced by making the blocks small. FIG. 12B shows the blocks in a recognizable size for the purpose of illustration. It is desirable, however, that the specific target region is formed of smaller blocks when embodied for the aforementioned reason.

The white balance correction value is calculated with respect to each of the divided blocks from the divided input image signals by a segment white balance correction value calculation unit 1306. The distribution of the calculated block white balance correction values is determined by a white balance correction value distribution determination unit 1308. Here, a determination is made as to whether or not the distribution is a distribution of a plurality of white balance correction values, and if determined to be a distribution of a plurality of white balance correction values, a determination is made as to which of the white balance correction values is to be used for each of the divided blocks.

Figure 14:
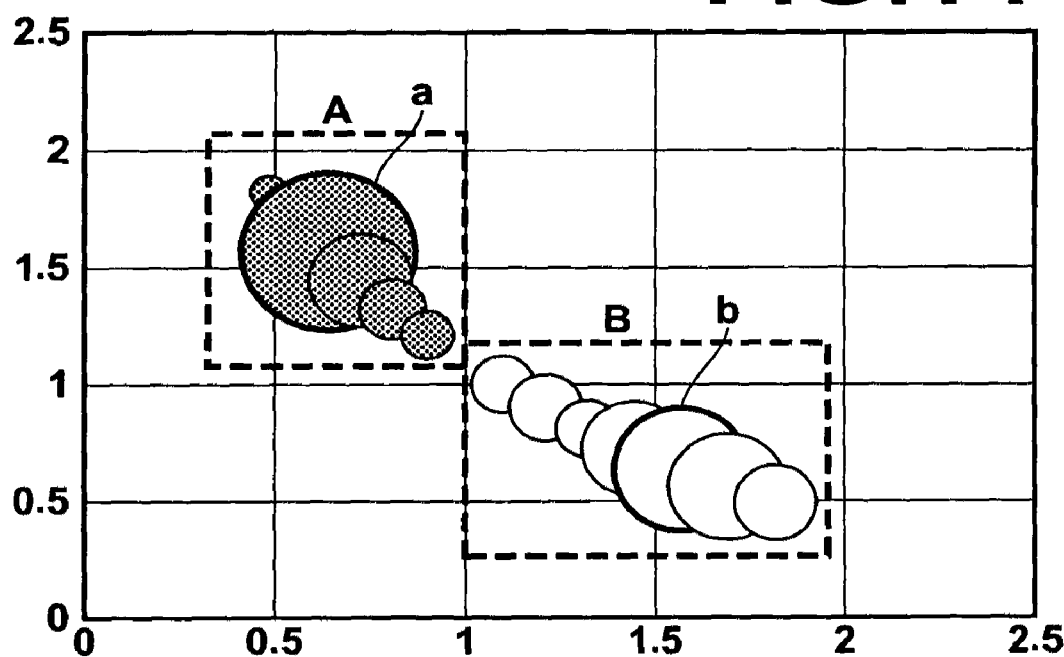
FIG. 14 illustrates an example frequency distribution of white balance correction values.

FIG. 14 illustrates an example frequency distribution of white balance correction values. The x and y axes in FIG. 14 indicate white balance correction values respectively. For example, in coordinates with x axis indicating coefficients with respect to A and y axis indicating coefficients with respect to B, the number of blocks with the white balance correction value indicated by the coefficient or the number of blocks in a range indicated by the coefficients is indicated by the size of a circle. The circle becomes large as the number of blocks with the white balance correction value indicated by the coefficient or the number of blocks in a range indicated by the coefficients increases. The example frequency distribution shown in FIG. 14 is determined to be a distribution of, for example, two white balance correction values of the regions A and B indicated by rectangular bold dotted lines. The determination method itself may be a well-known statistical method or the like, which is not the subject matter of the present invention and, therefore, will not be described here.

Here, the white balance correction value "a" which is the most frequent white balance correction value in the region A is regarded as the representative white balance correction value of the region A, and the white balance correction value "b" which is the most frequent white balance correction value in the region B is regarded as the representative white balance correction value of the region B. A white balance correction is performed on each of the blocks using the representative white balance correction value "a", if it is determined to be a block in the region A, or using the representative white balance correction value "b", if it is determined to be a block in the region B.

Further, the white balance correction is performed on each of the blocks by comparing the white balance correction value of the block with the representative white balance correction values "a" and "b", and using the value of the representative white balance correction value closer to the white balance correction value of the block.

Performance of such white balance corrections allow a specific target region to be uniform in hue (atmosphere) even when the specific target region is illuminated by a plurality of light sources. In this case, the specific target region is a person, but in contrary to this, when a region other than a person is detected, the background region may become uniform in hue (atmosphere). Further, even when an image has a specific target region illuminated by a plurality of light sources and a background region illuminated by a plurality of light sources, provision of a plurality of segment white balance correction value calculation units allows the specific target region to be uniform in hue (atmosphere) and the background region to be uniform in hue (atmosphere). In addition, it allows the hue of each of the regions to be changed in accordance with the light sources.

<Fourth Embodiment>

In the third embodiment, the white balance correction unit 54 is formed as a device, but it maybe embodied by software operating on the CPU 20, which will be described as a fourth embodiment hereinbelow.

Figure 15:
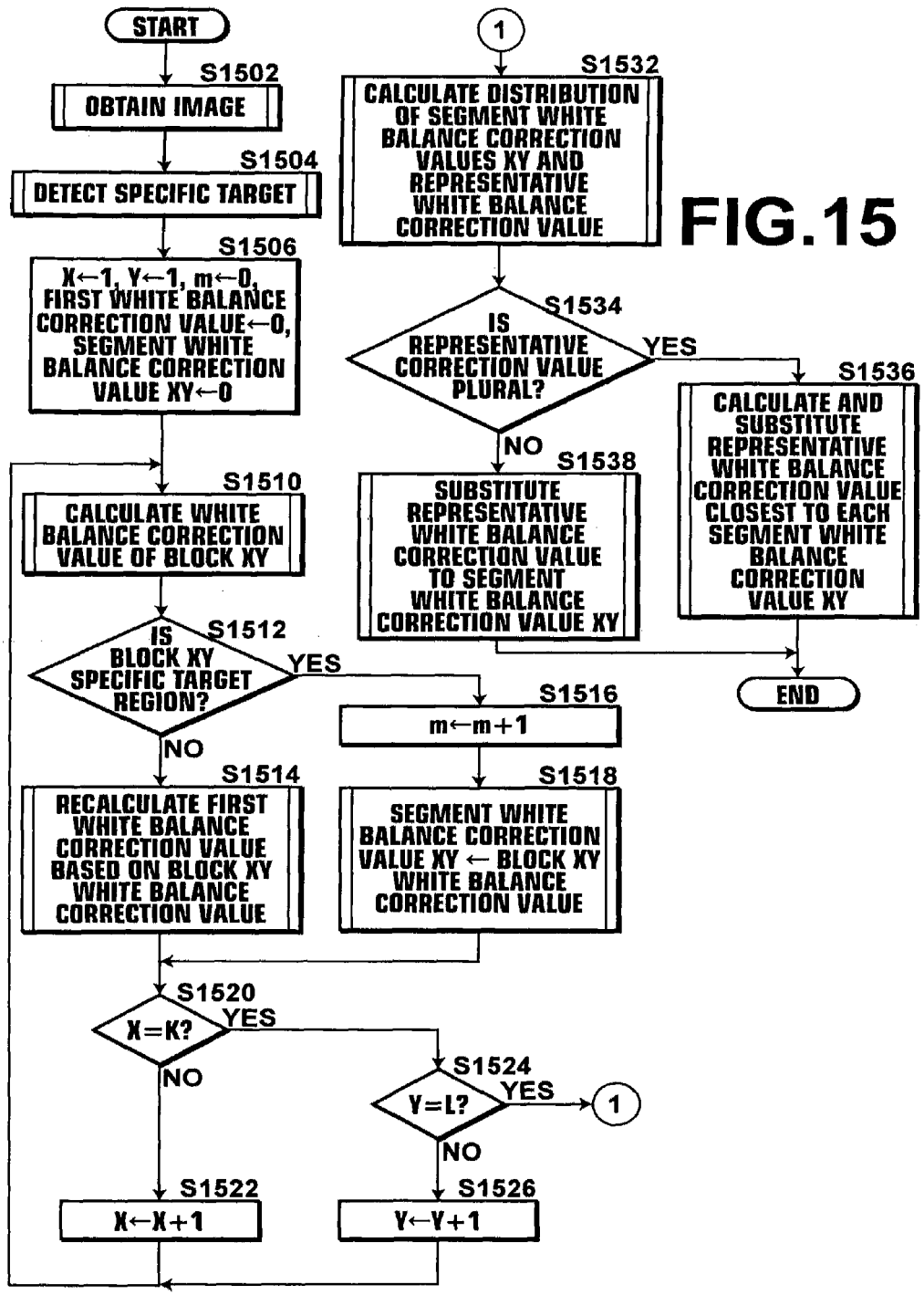
FIG. 15 is a flowchart of the white balance correction value calculation means of the present invention as a fourth embodiment.

FIG. 15 is a flowchart of the white balance correction value calculation means of the present invention as a fourth embodiment. Here, due to software processing, image signals are divided into K blocks in the x direction, and L blocks in the y direction.

First, in step S1502, image signals are obtained. Then, in step S1504, a specific target is detected from the obtained image signals. The detection of the specific target may be performed using the specific target detection unit 40 or by software operating on the CPU 20. The use of the specific target detection unit 40 will result in an increased processing speed by the dedicated hardware, while the use of the software will provide a flexible system configuration (e.g., coefficient or algorithm maybe updated easily) Thereafter, in step S1506, coefficients used for the subsequent processing are initialized. The x-direction counter X and y-direction counter Y are set to the initial value of "1", then the segment white balance correction value counter m is set to the initial value of "0", and the initial value of "0" is substituted to the first white balance correction value and segment white balance correction value XY (matrix).

Next, the processing is initiated. In step S1510, the white balance correction value of a block XY represented by block coordinates (X, Y) is calculated. Thereafter, in step S1512, a determination is made as to whether or not the block XY is the specific target region. If the block XY is not a specific target region, the process proceeds to step S1514 where the first white balance correction value is recalculated based on the white balance correction value of the block XY. Preferably, such algorithm is employed, in which, for example, a weighted addition is performed and the first white balance correction value is obtained when the loop is terminated. If the block XY is determined to be the specific target region in step S1512, the segment white balance correction value counter "m" is incremented in step S1516. Next, in step S1518, the calculated white balance correction value is substituted to the segment white balance correction value XY represented by the block coordinates (X, Y).

After step S1514 or S1518, a determination is made in step S1520 as to whether or not the X counter is K, that is, whether or not the block XY is the final block in the X direction. If X≠K, the counter X is incremented in step S1522, and the process returns to step S1510. If X=K in step S1522, a determination is made in step S1524 as to whether or not the counter Y is L, that is, whether or not the block XY is the final block in the Y direction. If Y≠L, the counter Y is incremented in step S1526, and the process returns to step S1510. If Y=L in step S1524, it means that the calculation of the white balance correction value has been completed for all of the blocks. In this case, the process proceeds to step S1532 where the distribution of ("m") white balance correction values XY is calculated, and one or more representative white balance correction values are calculated from the distribution of the white balance correction values XY. Then, in step S1534, a determination is made as to whether or not a plurality of representative white balance correction values is calculated in step S1532. If it is determined that a plurality of representative white balance correction values is provided, the process proceeds to step S1536 where the representative white balance correction value which is closest to the segment white balance correction values XY is calculated and substituted, and then the process is terminated. If it is determined in step S1534 that a single white balance is provided, the process proceeds to step S1538 where the representative white balance correction value is substituted to the segment white balance correction value XY.

In FIG. 15, different white balance correction value calculation methods are used for the specific target region and the region other than the specific target region. If a plurality of specific targets is present, it is desirable that the number of the segment white balance correction value calculation functions and the number of statistical routines is increased accordingly. For example, if three specific targets are detected, it is desirable that the segment white balance correction value for each of the three target regions is obtained and the correction value for each block of each specific target is obtained.

Figure 16:
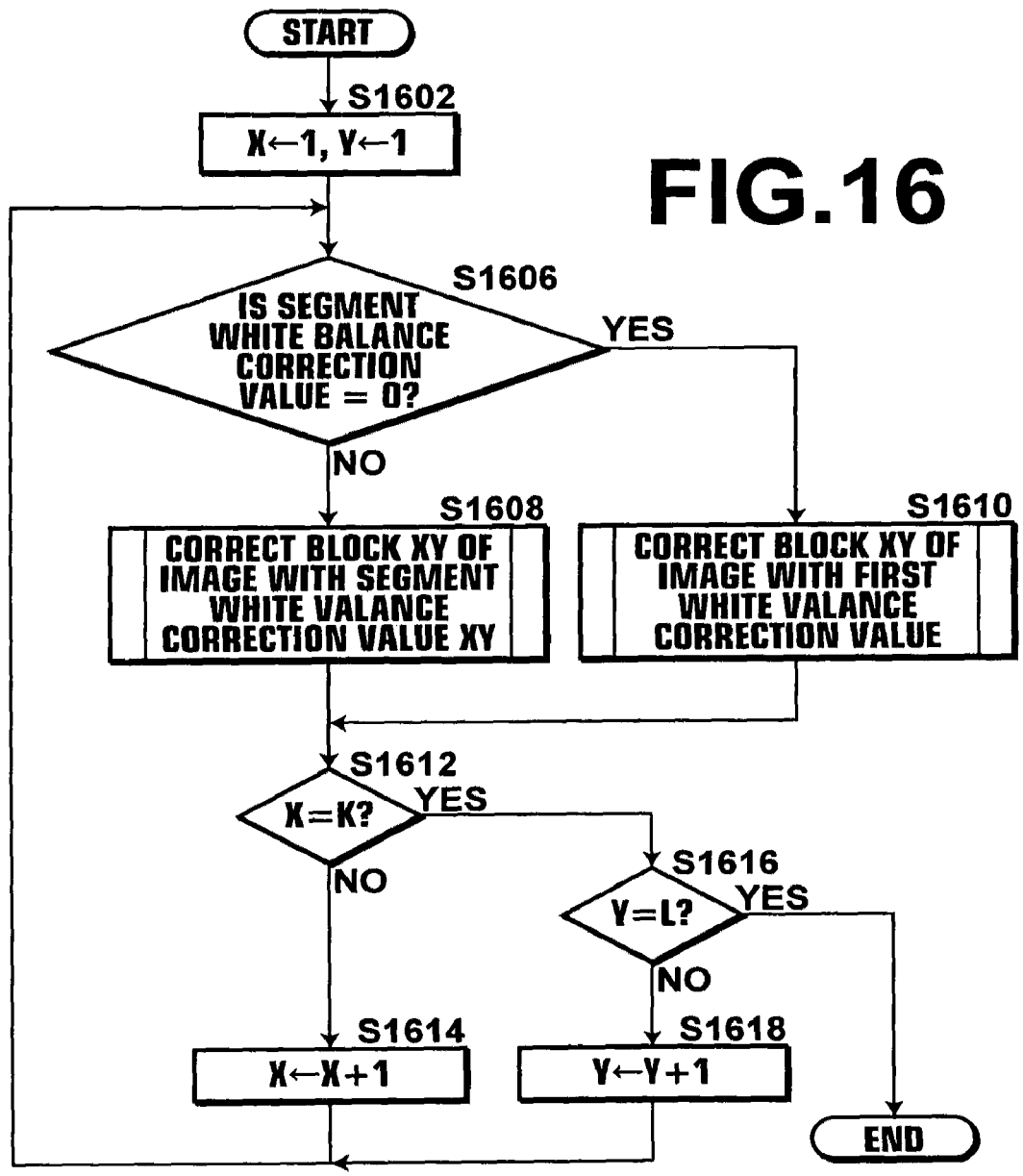
FIG. 16 is a flowchart of the white balance correction value correction means of the present invention as a fourth embodiment.

FIG. 16 is a flowchart of the white balance correction value correction means of the present invention as a fourth embodiment. It illustrates an example when performing a white balance correction using the white balance correction values calculated by the white balance correction value calculation means of the present invention shown in FIG. 15. Due to software processing, image signals are divided into K blocks in the x direction, and L blocks in the y direction as in the white balance correction value calculation means of the present invention shown in FIG. 15.

First, in step 1602, coefficients to be used in the subsequent steps are initialized. The x-direction counter X and y-direction counter Y are set to the initial value of "1".

Then, the processing is initiated. In step S1606, a determination is made as to whether or not the segment white balance correction value XY represented by the block coordinates (X, Y) is "0". If it is determined that the segment white balance correction value XY is not "0", it means that the segment white balance correction value has been calculated in the flowchart shown in FIG. 15, so that the process proceeds to step S1608 where the block XY of the image is corrected using the segment white balance correction value XY. If it is determined that the segment white balance correction value XY is "0", it means that the segment white balance correction value XY remains at the initial value, so that the process proceeds to step S1610 where the block XY of the image is corrected using the first white balance correction value.

After step S1608 or S1610, a determination is made in step S1612 as to whether or not the X counter is K, that is, whether or not the block XY is the final block in the X direction. If X≠K, the counter X is incremented in step S1614, and the process returns to step S1606. If X=K in step S1612, a determination is made in step S1616 as to whether or not the counter Y is L, that is, whether or not the block XY is the final block in the Y direction. If Y≠L, the counter Y is incremented in step S1618, and the process returns to step S1606. If Y=L in step S816, the process is terminated.

When a specific target region is illuminated by a plurality of light sources, an appropriate white balance correction according to the light sources may be realized with software through the steps described above. Note that not all of the process steps need to be performed by the software, and some of them may be replaced by hardware. Even in a case where the specific target or type of light source amounts to a large number, the software processing may handle it flexibly.

What is claimed is:

1. A white balance correction apparatus, comprising:
   a specific target detection means for detecting a specific target included in an inputted image signal based on a specific target evaluation value representing likeliness of the specific target;
   a first white balance correction means for obtaining a first white balance correction value for a region other than the specific target, and not using the specific target in said obtaining the first white balance correction value, in an image represented by the inputted image signal, and
   a second white balance correction means for obtaining a second white balance correction value for a region of the specific target detected by the specific target detection means,
   wherein, if the first and second white balance correction values are different from each other, white balance in the region other than the specific target is corrected using the first white balance correction value and white balance in the region of the specific target is corrected using the second white balance correction value.

2. The white balance correction apparatus of claim 1, wherein the specific target comprises a face.

3. The white balance correction apparatus of claim 1, wherein the second white balance correction means includes correction value distribution detection means for dividing the region of the specific target detected by the specific target detection means into a plurality of segments, obtaining a segment white balance correction value for each of the segments, and detecting a distribution of frequencies of sizes of the segment white balance correction values, and
   wherein, if the distribution of the frequencies of sizes of the segment white balance correction values is determined to be a distribution of a plurality of white balance correction values, the second white balance correction means comprises means for performing a white balance correction on the region of the specific target on a segment-by-segment basis using a representative distribution value of one of the plurality of white balance correction values which is closest to the segment white balance correction value of each of the segments.

4. The white balance correction apparatus of claim 3, wherein the specific target comprises a face.

5. A photographing apparatus including the white balance correction apparatus as claimed in claim 1.

6. A white balance correction method, comprising:
   detecting a specific target included in an inputted image signal based on a specific target evaluation value representing likeliness of the specific target;
   obtaining a first white balance correction value for a region other than the specific target, and not using the specific target in said obtaining the first white balance correction value, in an image represented by the inputted image signal and a second white balance correction value for a detected specific target region; and
   if the first and second white balance correction values are different from each other, correcting white balance in the region other than the specific target using the first white balance correction value and correcting white balance in the detected specific target region using the second white balance correction value.

7. The white balance correction method of claim 6, wherein said obtaining the second white balance correction value includes:
   dividing the detected specific target region into a plurality of segments;
   obtaining a segment white balance correction value for each of the segments; and
   detecting a distribution of frequencies of sizes of the segment white balance correction values, and
   wherein, if the distribution of the frequencies of sizes of the segment white balance correction values is determined to be a distribution of a plurality of white balance correction values, the white balance in the detected specific target region is corrected on a segment-by-segment basis using a value of one of the plurality of white balance correction values which is closest to the segment white balance correction value of each of the segments.

8. The white balance correction apparatus of claim 1, wherein the white balance correction apparatus further comprises:
   correction value distribution detection means for dividing the region of the specific target detected by the specific target detection means into a plurality of segments, obtaining a segment white balance correction value for each of the segments, and detecting a distribution of the segment white balance correction values.

9. The white balance correction apparatus of claim 8, wherein, if it is judged that the distribution of segment white balance correction values is a distribution of a plurality of white balance correction values, a white balance of each segment within the region of the specific target is corrected using a representative distribution value closest to the segment white balance correction value for the segment.

10. The white balance correction method of claim 6, further comprising:
    dividing the detected specific target region into a plurality of segments;
    obtaining a segment white balance correction value for each of the segments; and
    detecting a distribution of the segment white balance correction values.

11. The white balance correction method of claim 10, wherein, if it is judged that the distribution of segment white balance correction values is a distribution of a plurality of white balance correction values, a white balance of each segment within the detected specific target region is corrected using a representative distribution value closest to the segment white balance correction value for the segment.

12. The white balance correction apparatus of claim 1, wherein the white balance correction apparatus employs different white balance correction values to perform white balance correction in the region of the specific target and the region other than the specific target.

13. The white balance correction apparatus of claim 1, wherein the second white balance correction means comprises correction value distribution detection means for dividing the region of the specific target detected by the specific target detection means into a plurality of segments, obtaining a segment white balance correction value for each of the segments, and detecting a distribution of frequencies of sizes of the segment white balance correction values.

14. The white balance correction apparatus of claim 1, wherein the second white balance correction means includes correction value distribution detection means for obtaining a segment white balance correction value for each of segments of the region of the specific target, and detecting a distribution of frequencies of sizes of the segment white balance correction values.

15. The white balance correction method of claim 6, wherein, different white balance correction values are employed to perform white balance correction in the detected specific target region and the region other than the specific target.

16. The white balance correction method of claim 6, wherein said obtaining the second white balance correction value includes:
   dividing the detected specific target region into a plurality of segments;
   obtaining a segment white balance correction value for each of the segments; and
   detecting a distribution of frequencies of sizes of the segment white balance correction values.

17. The white balance correction method of claim 6, wherein said obtaining the second white balance correction value includes:
   obtaining a segment white balance correction value for each segments of the detected specific target region; and
   detecting a distribution of frequencies of sizes of the segment white balance correction values.

* * * * *